United States Patent
Liao

(10) Patent No.: US 12,541,054 B2
(45) Date of Patent: Feb. 3, 2026

(54) PHOTONIC DEVICE AND METHOD OF FABRICATING SAME

(71) Applicant: Taiwan Semiconductor Manufacturing Company LTD, Hsinchu (TW)

(72) Inventor: Shih-Yu Liao, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 279 days.

(21) Appl. No.: 18/375,307

(22) Filed: Sep. 29, 2023

(65) Prior Publication Data

US 2025/0110271 A1    Apr. 3, 2025

(51) Int. Cl.
*G02B 6/136*    (2006.01)
*G02B 6/12*    (2006.01)

(52) U.S. Cl.
CPC ......... *G02B 6/12004* (2013.01); *G02B 6/136* (2013.01); *G02B 2006/12061* (2013.01); *G02B 2006/12097* (2013.01)

(58) Field of Classification Search
CPC ...................................... G02B 6/136
See application file for complete search history.

(56) References Cited

U.S. PATENT DOCUMENTS

| 6,888,989 | B1 * | 5/2005 | Zhou ................. | G02B 6/3636 385/14 |
|---|---|---|---|---|
| 2018/0128974 | A1 | 5/2018 | Iida et al. | |
| 2018/0182997 | A1 | 6/2018 | Kim et al. | |
| 2019/0187370 | A1 | 6/2019 | Corp | |
| 2019/0196321 | A1 | 6/2019 | Kim et al. | |
| 2019/0391325 | A1 | 12/2019 | Iida et al. | |
| 2023/0061568 | A1 * | 3/2023 | Hsu .................. | G02B 6/305 |
| 2023/0229029 | A1 | 7/2023 | Campus | |

FOREIGN PATENT DOCUMENTS

| CN | 109564362 A | | 4/2019 | |
| CN | 109596570 A | * | 4/2019 | ............ G01N 21/45 |
| JP | 2005035281 A | * | 2/2005 | ............ B41J 2/1603 |
| JP | 2010175924 A | * | 8/2010 | |
| TW | 445656 B | | 7/2001 | |
| TW | 202230468 A | | 8/2022 | |

OTHER PUBLICATIONS

Taiwan Office Action for Application No. 11420508710 Dated May 19, 2025.

* cited by examiner

Primary Examiner — Charlie Y Peng
(74) Attorney, Agent, or Firm — Lippes Mathias LLP

(57) ABSTRACT

A photonic device structure and method of fabricating the same. The structure includes a substrate that has a topside oxide layer and a silicon layer that is formed on the topside oxide layer. The structure further includes a rib waveguide component formed in the silicon layer and that includes contact holes. The contact holes include a contact hole depth, and a contact hole trench that is formed in the silicon layer and which has a first sidewall, a second sidewall, and a bottom surface. The contact hole further includes a contact etch stop layer formed in the contact hole trench.

20 Claims, 17 Drawing Sheets

PHOTONIC DEVICE AND METHOD OF FABRICATING SAME

BACKGROUND

As integrated circuits (ICs) become increasingly smaller and faster, electrical signals used in various types of ICs are also subject to increasing delays caused by capacitance, inductance, or resistance in the ICs. At a certain high speed and/or frequency, such delays become a design concern. To avoid potential signal delay issues, optical signals are used instead of electrical signals for data transmission in some situations.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
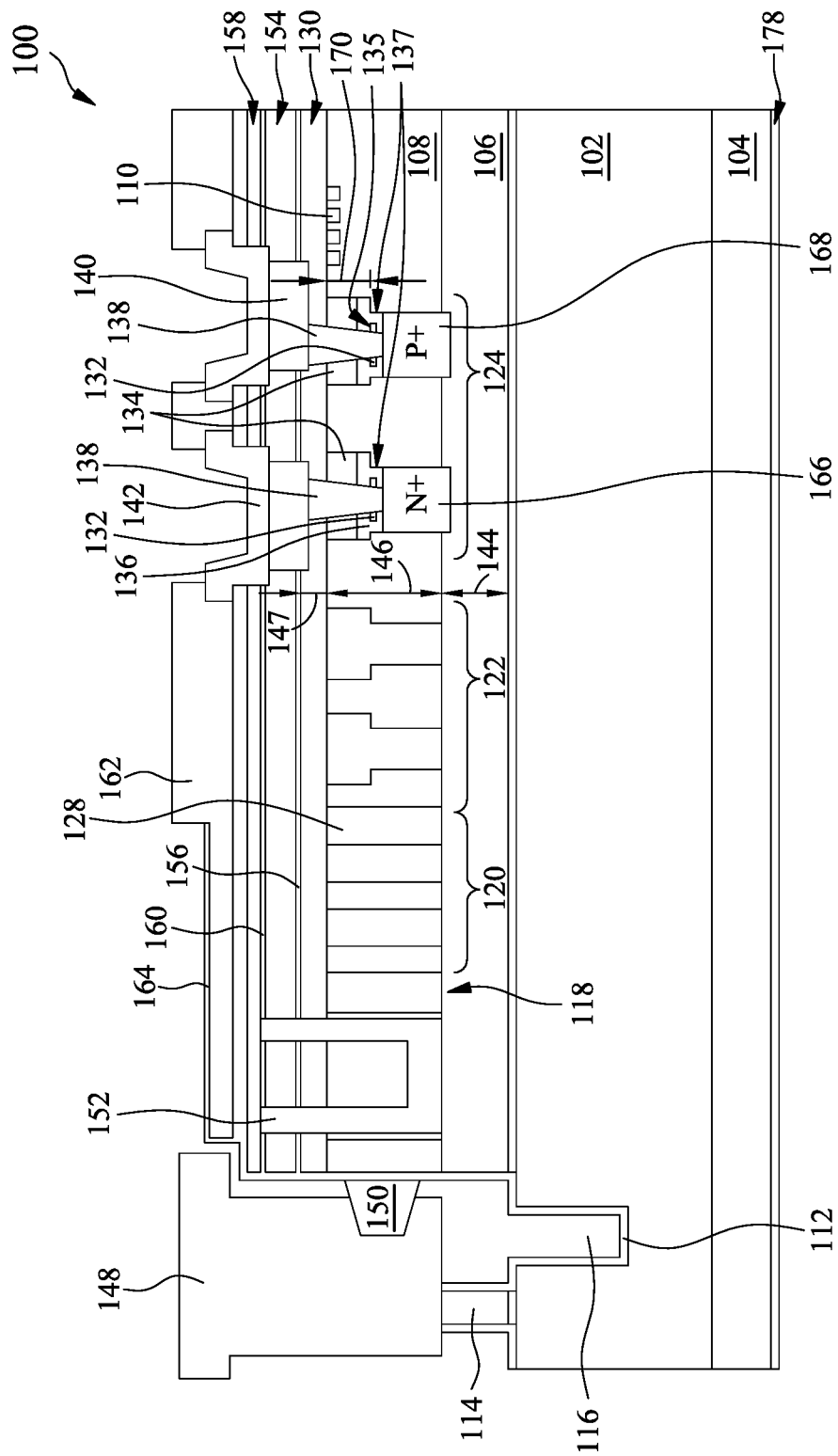
FIG. 1 is a cross-sectional view of a photonic device in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about" can be used to include any numerical value that can vary without changing the basic function of that value. When used with a range, "about" also discloses the range defined by the absolute values of the two endpoints, e.g., "about 2 to about 4" also discloses the range "from 2 to 4." The term "about" may refer to plus or minus 10% of the indicated number.

The present disclosure relates to structures which are made up of different layers. When the terms "on" or "upon" are used with reference to two different layers (including the substrate), they indicate merely that one layer is on or upon the other layer. These terms do not require the two layers to directly contact each other, and permit other layers to be between the two layers. For example, all layers of the structure can be considered to be "on" the substrate, even though they do not all directly contact the substrate. The term "directly" may be used to indicate two layers directly contact each other without any layers in between them. In addition, when referring to performing process steps to the substrate, this should be construed as performing such steps to whatever layers may be present on the substrate as well, depending on the context.

Rib waveguides include a contact extending through a contact etch stop layer to contact a dopant region positioned underneath. Oxide hard masks or layers deposited on the contact etch stop layer may collapse during patterning of the contact etch stop layer and/or patterning of the contact itself. In accordance with some embodiments recited herein, a rib trench is used to prevent mask collapse during patterning of the etch stop layer.

Turning now to FIG. 1, there is shown a photonic device 100 in accordance with one embodiment. As shown in FIG. 1, the photonic device 100 includes a substrate 102 having backside oxide layer 104 and a first topside oxide layer 106. In accordance with some embodiments, the substrate 102 may comprise, for example and without limitation, silicon, for example and without limitation, in the form of crystalline Si or polycrystalline Si. In alternative embodiments, the substrate 102 can be made of other elementary semiconductors such as germanium, or may include a compound semiconductor such as silicon carbide (SiC), gallium arsenide (GaAs), gallium carbide, gallium phosphide, indium arsenide (InAs), indium phosphide (InP), silicon germanium, silicon germanium carbide, gallium arsenic phosphide, or gallium indium phosphide. In accordance with one embodiment, the substrate 102 may be implemented as an SOI substrate, i.e., a silicon-on-insulator substrate. In such embodiments, the substrate 102 may comprise, for example and without limitation silicon oxide, or other suitable insulative material.

According to some embodiments, the backside oxide layer 104 and the first topside oxide layer 106 may comprise, for example and without limitation, non-low-k dielectric materials such as silicon oxide, silicon carbide (SiC), silicon carbo-nitride (SiCN), silicon oxy-carbo-nitride (SiOCN), or the like. In such embodiments, the backside oxide layer 104 and the first topside oxide layer 106 may have a thickness in the range of 0.5 μm to 3 μm and in some embodiments, may have a thickness of 2 μm. As shown in FIG. 1, the photonic device 100 further includes a first silicon layer 108, formed on the first topside oxide layer 106. In accordance with some embodiments, the first silicon layer 108 may comprise a silicon, for example and without limitation, in the form of crystalline Si or polycrystalline Si. In accordance with some embodiments, the first silicon layer 108 may be implemented with a thickness in the range of 1 μm to 5 μm, and in some embodiments, may have a thickness of 3 μm. A distributed Bragg reflector ("DBR") 110 is formed on a top portion of the first silicon layer 108, as depicted in FIG. 1. It will be appreciated that the construction and/or location of the DBR 110 may be dependent upon the particular application for which the photonic device 100 is used, the needed wavelengths traveling therethrough, and the like.

The photonic device 100 of FIG. 1 further includes a first etch stop layer 112, formed on portions of the substrate 102 and additional layers of the photonic device 100, as described herein. It will be appreciated that the first etch stop layer 112 may comprise any suitable barrier material configured to protect the layers and components below from damage during subsequent etching processes. The first etch stop layer 112 may be implemented as tantalum oxide (TaO), tantalum (Ta), titanium (Ti), silicon nitride (SiN), and the like. It will be appreciated that the first etch stop layer 112 corresponds to a layer of material that has drastically different etching characteristics than the material to be etched, so as to stop or halt the etching processing of the layer deposited on the etch stop layer. In accordance with one embodiment, a pillar 114 is formed from the material of the first silicon layer 108 on one side of the photonic device 100, as shown in FIG. 1. In some embodiments, the pillar 114 is positioned adjacent a pillar cavity 116, extending downward into the substrate 102, as illustrated in FIG. 1. According to such embodiments, the pillar 114 may be used to support a light source 148, as discussed in greater detail below.

The photonic device 100 illustrated in FIG. 1 further includes an echelle grating component 118, a strip waveguide component 120, a rib to strip (R2S) waveguide component 122, and a rib waveguide component 124. Each of the aforementioned waveguide components 118-124 are suitably positioned at least partially in the first silicon layer 108. As shown in FIG. 1, a silicate glass material 128 is formed within each of the waveguide components 118-124, as described in greater detail below with respect to FIGS. 2A-2AD. That is, as depicted in FIG. 1, the silicate glass material 128 may be deposited between portions of the first silicon layer 108, the combination thereof providing structure to the aforementioned waveguide components 118-124. In accordance with one example embodiment the silicate glass material 128 is a borophosphosilicate glass (BPSG) material. It will be appreciated that other suitable silicate glasses or materials providing similar optic properties and/or insulative properties may be used in other embodiments.

In accordance with some embodiments, the echelle grating waveguide component 118 may correspond to a type of diffraction grating having relatively low groove density and a groove shape that is optimized for use at high incidence angles and thus high diffraction orders. In accordance with further embodiments, the strip waveguide component 120 may correspond to a class of waveguides having the form of a channel running along the surface of some solid transparent host medium, e.g., a dielectric or semiconductor. The R2S waveguide component 122 may correspond to a (converter component that converts a rib waveguide output to a strip waveguide input and/or a strip waveguide output to a rib waveguide input. Further, as shown in FIG. 1, the photonic device 100 includes a waveguide component 124, which may correspond to a waveguide in which the guiding layer may consists of the slab with a strip (or several strips) superimposed onto it. As will be appreciated by the skilled artisans, rib waveguides may provide confinement of the wave in two dimensions and near-unity confinement is possible in multi-layer rib structures. It will be appreciated that while a single rib waveguide component 124 is shown in FIG. 1, the photonic device 100 may be implemented with multiple rib waveguide components, e.g., three, four, five, etc., in accordance with desired design configurations. As such, the illustration in FIG. 1 is intended solely as one illustrative example embodiment in accordance with the subject disclosure.

As shown in FIG. 1, the photonic device 100 further includes an undoped silicate glass ("USG") component 130 disposed on the first silicon layer 108 and the BSPG material 108. In some embodiments, the undoped silicate glass (USG) component 130 may be implemented having a thickness in the range of 5000 angstroms to 10,000 angstroms. In one embodiment, the undoped silicate glass (USG) component 130 is implanted with a thickness of 8 angstroms.

A second etch stop layer 156 is formed on the USG component 130, as shown in FIG. 1. In accordance with some embodiments, the second etch stop layer 156 may comprise a suitable barrier material configured to protect the layers and components below from damage during subsequent etching processes. The second etch stop layer 156 may be implemented as tantalum oxide (TaO), tantalum (Ta), titanium (Ti), silicon nitride (SiN), and the like. It will be appreciated that the second etch stop layer 156 corresponds to a layer of material that has drastically different etching characteristics than the material to be etched, so as to stop or halt the etching processing of the layer deposited on the etch stop layer.

Positioned above the second etch stop layer 156 is a second topside oxide layer 154. A third topside oxide layer 158 is suitably formed on the second etch stop layer 156, as shown in FIG. 1. In accordance with some embodiments, the second topside oxide layer 154 and the third topside oxide layer 158 may comprise, for example and without limitation, for example and without limitation, non-low-k dielectric materials such as silicon oxide, silicon carbide (SiC), silicon carbo-nitride (SiCN), silicon oxy-carbo-nitride (SiOCN), or the like. A third etch stop layer 160 is depicted in FIG. 1, formed on the third topside oxide layer 158. As indicated above with respect to the first and second etch stop layers 112 and 156, the third etch stop layer 160 suitably comprises a layer of material that has drastically different etching characteristics than the material to be etched, so as to stop or halt the etching processing of the layer deposited on the etch stop layer. Accordingly, the third etch stop layer 160 may comprise, for example and without limitation tantalum oxide (TaO), tantalum (Ta), titanium (Ti), silicon nitride (SiN), and the like.

In accordance with some embodiments, the photonic device 100 of FIG. 1 further includes a fourth topside oxide layer 162 formed or deposited on the third etch stop layer 160. Such fourth topside oxide layer 162 may comprise, for example and without limitation, non-low-k dielectric materials such as silicon oxide, SiC, SiCN, SiOCN, or the like. A fourth etch stop layer 164 may be formed on the fourth topside oxide layer 162, as shown in FIG. 1. In some embodiments, the fourth etch stop layer 164 may comprise, for example and without limitation tantalum oxide (TaO), tantalum (Ta), titanium (Ti), silicon nitride (SiN), and the like. In varying embodiments disclosed herein, the first, second, third, and fourth topside oxide layers 106, 154, 158, and 162 may comprise the same or different oxide materials. In some embodiments, the aforementioned oxide layers 106, 154, 158, and 162 may comprise the same oxide material, deposited or formed at different times or stages of the fabrication of the photonic device 100.

In FIG. 1, the rib waveguide component 124 includes rib contact holes 134 an upper portion extending a preselected distance into the first silicon layer 108, a lower portion comprising a contact hole or rib trench 137 formed in the first silicon layer 108, and a contact etch stop layer cavity 135 formed within a contact oxide layer 136 deposited in the trench 137, rib contacts 138 formed of a suitably conductive material extending through the rib contact holes 134, a rib N+ doped component 166, and a P+ doped component 168 positioned below a contact etch stop layer (CESL) 132 within the first silicon layer 108. As illustrated in FIG. 1, each contact hole 134 includes the aforementioned silicate glass material 128. In accordance with some embodiments, the thickness or depth of the contact etch stop layer (CESL) 132 is 5% or greater than the depth 170 of the contact hole 134.

According to some embodiments, the contact oxide layer 136 may comprise, for example and without limitation, non-low-k dielectric materials such as silicon oxide, silicon carbide (SiC), silicon carbo-nitride (SiCN), silicon oxy-carbo-nitride (SiOCN), or the like. In accordance with some embodiments, the contact etch stop layer (CESL) 132 may be fabricated of, for example and without limitation, oxide, SiN, undoped silicate glass, fluorosilicate glass, borophosphosilicate glass, or the like. As shown in FIG. 1, the contact etch stop layer (CESL) 132 is formed within the contact etch stop layer cavity 135 of the contact oxide layer 136 in the contact hole trench 137. In accordance with some embodiments, the contact etch stop layer (CESL) 132 is positioned within the oxide layer 136 within the contact hole or rib trench 137 such that the distance between the contact etch stop layer (CESL) 132 and the silicon substrate 108 is greater than or equal to one fourth the thickness of the contact etch stop layer (CESL) 132.

As will be appreciated, the doping to form components 166 and 168 may be done, for example, by ion implantation. Briefly, an ion implanter is used to implant atoms into a silicon crystal lattice, modifying the conductivity of the lattice in the implanted location. An ion implanter generally includes an ion source, a beam line, and a process chamber. The ion source produces the desired ions (here, for example, Co, Ti, Ni, Pt, or Pb, depending on desired N- or P-type electrode). The beam line organizes the ions into a beam having high purity in terms of ion mass, energy, and species. The ion beam is then used to irradiate the wafer substrate in a process chamber. The ion beam strikes the exposed regions on the wafer substrate, and the ions can be implanted into the substrate as dopants at desired depths. Alternatively, the substrate can be partially etched, followed by blanket deposition of a metal, followed by annealing in which the metal reacts with the underlying exposed silicon. Unreacted metal can then be removed, for example with a selective etch process. As illustrated in FIG. 1, the contact holes 134 include a contact hole depth 170 of between 8,000 to 14,000 angstroms into the first silicon layer 108. In other embodiments, the contact hole depth 170 is in the range of between 9,000 to 12,000 angstroms into the first silicon layer 108. In accordance with some embodiments, the rib doped components 166 and 168 may have a dopant concentration that is. It will further be appreciated that the contacts 138 extend through the contact etch stop layer (CESL) 132 to contact respective first rib doped components 166 and 168.

In accordance with some embodiments, the contacts 138 are electrically contacting metal components 140 formed partially in the second and third topside oxide layers 154 and 158, as shown in FIG. 1. According to such an embodiment, each metal component 140, which may provide similar function to a via, is in electrical contact with a corresponding bump pad 142. It will be appreciated that the metal components 140 may be implemented as, for example and without limitation, any suitable conductive material including, for example and without limitation, a suitable conductive metal including, for example and without limitation, copper, aluminum, iron, alloys thereof. Further, some embodiments disclosed herein may utilize a bump pad 142 comprised of, for example and without limitation, Al, Fe, Cu, Al—Cu, alloys thereof, or any other suitable material, as will be appreciated by the skilled artisan. As shown in FIG. 1, each of the bump pads 142 are suitably disposed through the fourth topside oxide layer 162. Subsequent fabrication (not shown) may include the addition of one or more solder bumps comprising lead-alloy solders, lead-free solders, flux-core solder, silver-alloy solders, or the like.

In accordance with one embodiment, the photonic device 100 of FIG. 1 may utilize a light source 148 coupled to the pillar 114 and positioned above the pillar cavity 116. The light source 148 may be implemented as, for example and without limitation, a laser (e.g., a III-V laser), an optical fiber, an exterior light source, a reflected light, or the like. In some embodiments, the light source 148 may produce light in the wavelength range of 200 nm to 1300 nm, and in some embodiments in the range of 300 nm to 1200 nm. A facet 150 is optically coupled to the light source 148, directing any light into the photonic device 100, as shown in FIG. 1. Accordingly, the illustration of the light source component 148 depicted in FIG. 1 is intended merely to illustrate the direction of light (i.e., photons) into the photonic device 100. The photonic device 100 of FIG. 1 may further include one or more metal components 152 disposed therein to provide additional functionality and transmissivity therein.

Figure 2A:
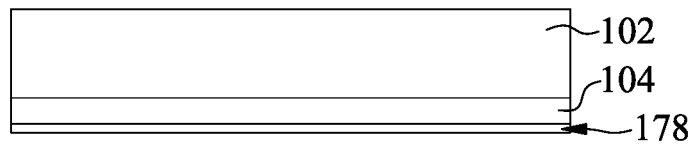
FIGS. 2A-2AD are cross-sectional views of stages of fabricating a portion of the photonic device of FIG. 1 in accordance with some embodiments.

Turning now to FIGS. 2A-AD, there are shown a series of intermediate stages of fabrication optical components of the photonic device 100 of FIG. 1 in accordance with some embodiments. The patterning of a layer may employ any suitable patterning technique such as a photolithographic patterning technique using deposition of a photoresist layer and selective exposure via a photomask to visible light, ultraviolet light, deep ultraviolet light (i.e., DUV lithography), extreme ultraviolet light (i.e. EUV lithography), or so forth, followed by development of the exposed photoresist and subsequent etching, deposition or other process steps laterally delineated by the developed photoresist. In other embodiments, patterning of an electron-sensitive resist layer may be by way of electron beam exposure (electron beam lithography, i.e., e-beam lithography). The skilled artisan will appreciate that the foregoing are merely illustrative examples.

As shown in FIG. 2A, a substrate 102 is formed having a backside oxide layer 104. In some embodiments, the backside oxide layer 104 includes a polyimide layer 178 formed on a surface thereof opposite the surface contacting the substrate 102. In accordance with one embodiment, the substrate 102 is an SOI substrate, as described above with respect to FIG. 1.

Figure 2B:
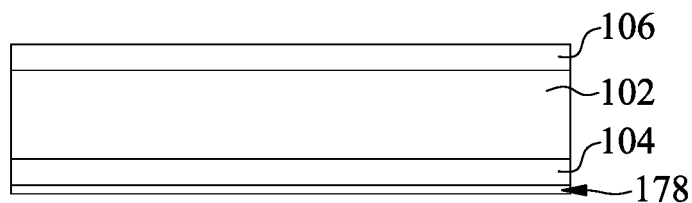

In FIG. 2B, a first topside oxide layer 106 is formed on the substrate 102. As shown in FIG. 2B, the first topside oxide layer 106 is deposited on the top side of the substrate opposite the side of the substrate 102 to which the bottom oxide layer 104 is attached. As referenced above, the first topside oxide layer 106 may comprise, for example and without limitation, non-low-k dielectric materials such as silicon oxide, silicon carbide (SiC), silicon carbo-nitride (SiCN), silicon oxy-carbo-nitride (SiOCN), or the like. In accordance with some embodiments, formation of the first topside oxide layer 106 may be accomplished via any suitable deposition or layer processes, including, for example and without limitation, deposited by, for example, chemical vapor deposition (CVD), physical vapor deposition (PVD), atomic layer deposition (ALD), sputtering, another deposition process, or any suitable combination thereof. In some embodiments, chemical-mechanical polishing (CMP) may be performed after deposition of the first topside layer 106, resulting in the planar surface shown in FIG. 2B.

Figure 2C:
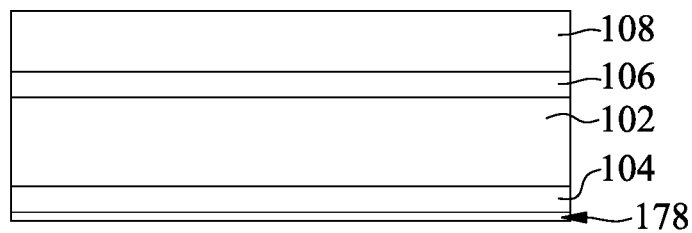

A first silicon layer 108 is then deposited on the first topside oxide layer 106, as shown in FIG. 2C. Suitable methods of forming the first silicon layer 108 may include, for example and without limitation, chemical vapor deposition (CVD), physical vapor deposition (PVD), atomic layer deposition (ALD), sputtering, another deposition process, or any suitable combination thereof. In some embodiments, chemical-mechanical polishing (CMP) may be performed after deposition of the first silicon layer 108, resulting in the planar surface shown in FIG. 2C. The first silicon layer 108 may comprise a silicon, for example and without limitation, in the form of crystalline Si or polycrystalline Si. In accordance with some embodiments, the first silicon layer 108 may be implemented with a thickness in the range of 1 µm to 5 µm, and in some embodiments, may have a thickness of 3 µm.

Figure 2D:
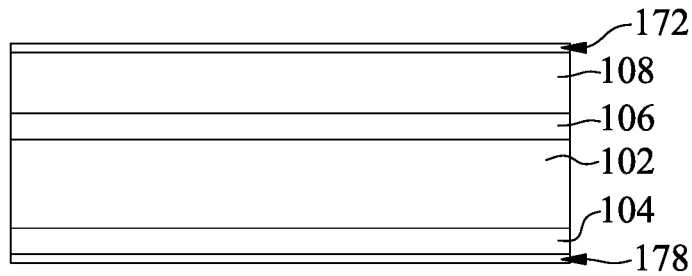

A hard mask 172 is then formed on the first silicon layer 108, as depicted in FIG. 2D. In accordance with some embodiments, the hard mask 172 comprises layers of oxide material with a polyimide layer disposed therebetween. In some embodiments, a first oxide material is deposited, followed by CMP, after which the polyimide material is deposited. After CMP is performed on the polyimide material, a second oxide material is deposited, after which CMP is performed, resulting in the intermediate stage of fabrication shown in FIG. 2D. As discussed above, various deposition methods may be used to produce the layers of the hard mask 172, as will be appreciated by the skilled artisan.

Figure 2E:
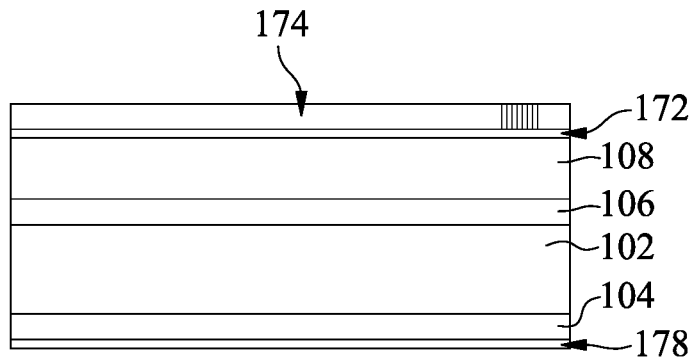
Figure 2F:
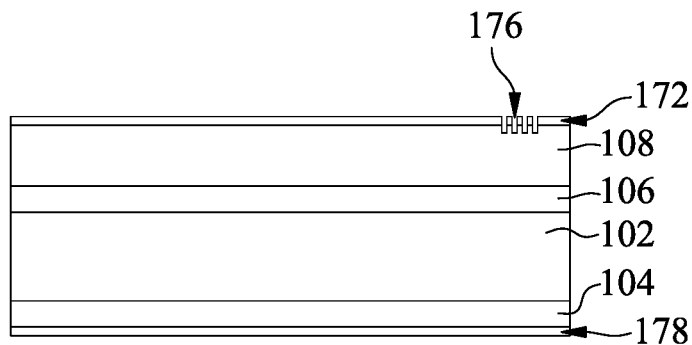
Figure 2G:
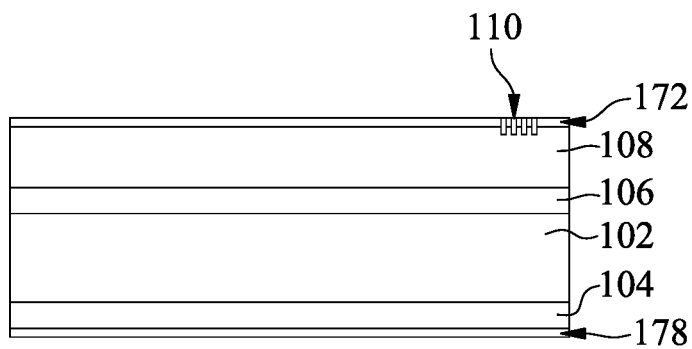

A photoresist 174 is then deposited and patterned on the hard mask 172, as illustrated in FIG. 2E. In some embodiments, the photoresist 174 is applied to the hard mask 172, after which portions of the photoresist 174 are developed by exposure from a suitable light source to form a pattern thereon. The unexposed portions are then removed, resulting in the patterned photoresist 174 shown in FIG. 2E. Etching is then performed to remove those portions of the hard mask 172 and/or underlying first silicon layer 108 to form distributed Bragg reflector (DBR) holes 176. Suitable removal processes include, for example and without limitation, an etching process implemented as a dry etching process, a RIE process, a wet etching process, some other etching process, or a combination of the foregoing. In accordance with some embodiments, the DBR holes 176 may be implemented with a depth in the range of 0.01 µm to 0.6 µm, and in some embodiments, the depth of the DBR holes 176 may be less than or equal to 0.4 µm. FIG. 2F provides an illustration of the photonic device 100 after formation of the DBR holes 176. The DBR holes 176 are then filled with a suitable material having a desired refractive index for forming the DBR 110, as shown in FIG. 2G. In accordance with some embodiments, the DBR holes 176 are filled with a silicate glass, an oxide material, including, for example and without limitation, undoped silicate glass, BPSG glass, or the like.

Figure 2H:
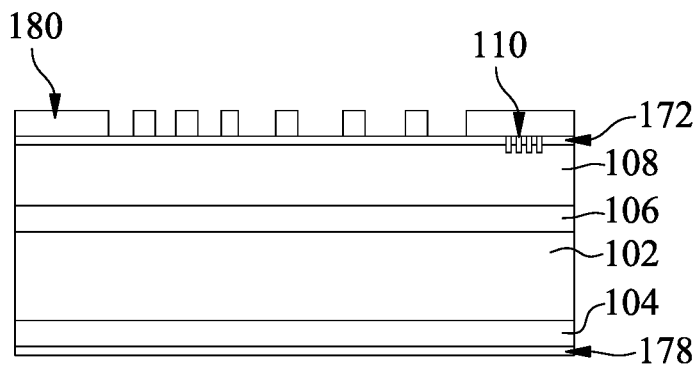
Figure 2I:
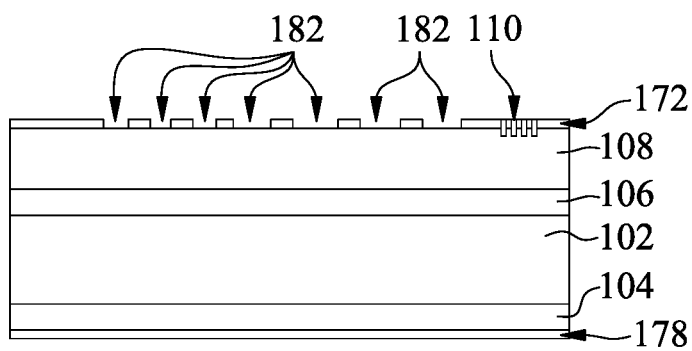

In FIG. 2H, a photoresist 180 is then deposited and patterned on the hard mask 172. In some embodiments, the photoresist 180 is applied to the hard mask 172, after which portions of the photoresist 180 are developed by exposure from a suitable light source to form a pattern thereon. The unexposed portions are then removed, resulting in the patterned photoresist 180 shown in FIG. 2H. Etching is then performed to remove those portions of the hard mask 186 and/or underlying first silicon layer 108 to form strip and rib hard mask holes 182, as illustrated in FIG. 2I. Suitable removal processes include, for example and without limitation, an etching process implemented as a dry etching process, a RIE process, a wet etching process, some other etching process, or a combination of the foregoing.

Figure 2J:
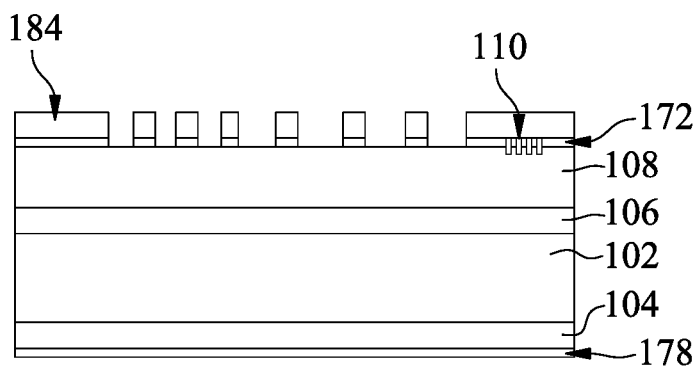
Figure 2K:
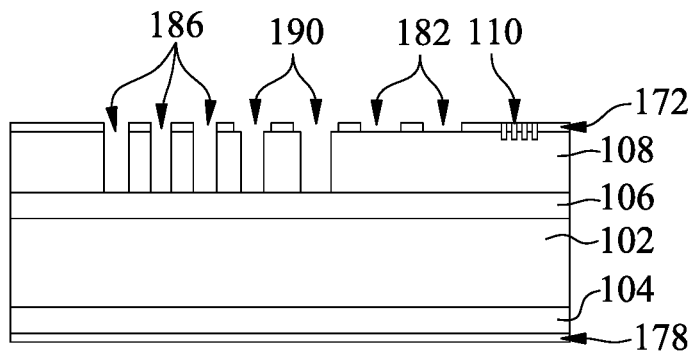

A photoresist 184 is then deposited and patterned on the hard mask 172, as shown in FIG. 2J. In some embodiments, the photoresist 184 is applied to the hard mask 172, after which portions of the photoresist 184 are developed by exposure from a suitable light source to form a pattern thereon. The unexposed portions are then removed, resulting in the patterned photoresist 184 shown in FIG. 2J. Etching is then performed to remove those portions of the first silicon layer 108 to enable formation of strip holes 186, as illustrated in FIG. 2K. Suitable removal processes include, for example and without limitation, an etching process implemented as a dry etching process, a RIE process, a wet etching process, some other etching process, or a combination of the foregoing.

Figure 2L:
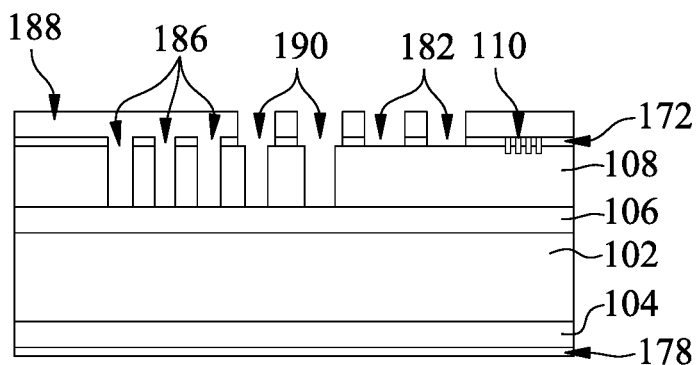
Figure 2M:
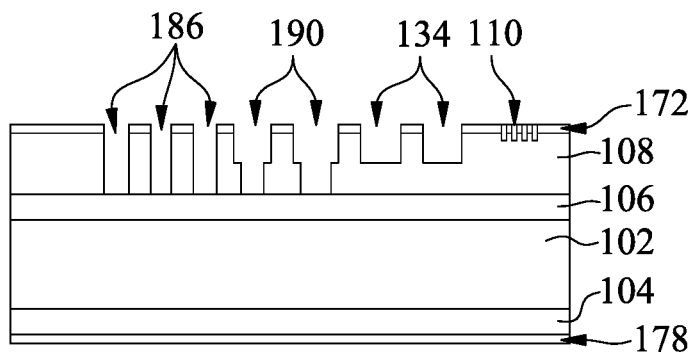

In FIG. 2L, a photoresist 188 is deposited and patterned on the hard mask 172 and in a portion of the strip holes 186. As illustrated in FIG. 2L, the photoresist is further patterned to enable formation of the rib waveguide component 124. The photoresist 188 is then exposed, and the unexposed portions of the photoresist 188 are removed, resulting in the intermediate fabrication stage of the photonic device 100 shown in FIG. 2L. Thereafter, etching is then performed to remove those portions of the first silicon layer 108 to enable formation of R2S holes 190 and the rib contact holes 134, as illustrated in FIG. 2M. Suitable etching processes include, for example and without limitation, a dry etching process, a RIE process, a wet etching process, some other etching process, or a combination of the foregoing.

Figure 2N:
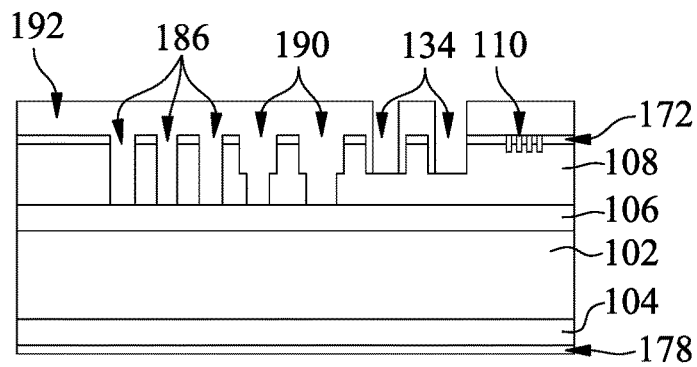
Figure 2O:
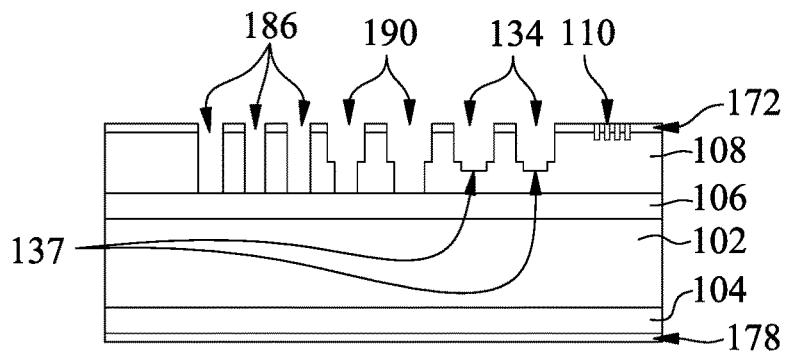

In FIG. 2N, a photoresist 192 is deposited and patterned on the hard mask 172 and in the strip holes 186, the R2S holes 190, and a portion of the rib contact holes 134. As illustrated in FIG. 2N, the photoresist 192 is applied, after which portions of the photoresist 192 are developed by exposure from a suitable light source to form the contact hole trench 137, which defines the location of the contact etch stop layer 132. Thereafter, etching is then performed to remove those portions of the first silicon layer 108 to enable formation of rib contact hole trenches 137, as illustrated in FIG. 2O. Suitable etching processes include, for example and without limitation, a dry etching process, a RIE process, a wet etching process, some other etching process, or a combination of the foregoing.

Figure 2P:
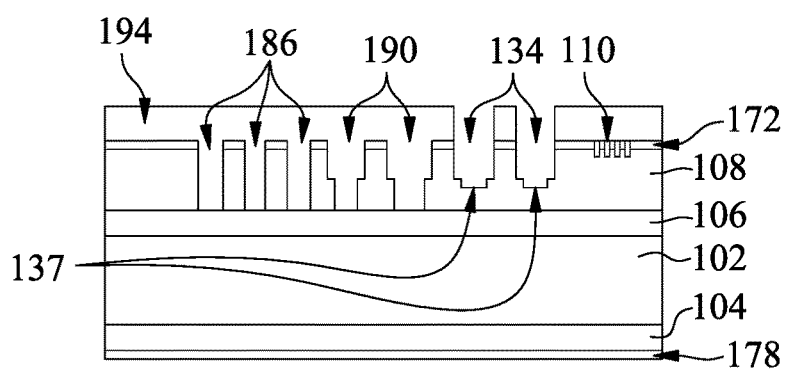
Figure 2Q:
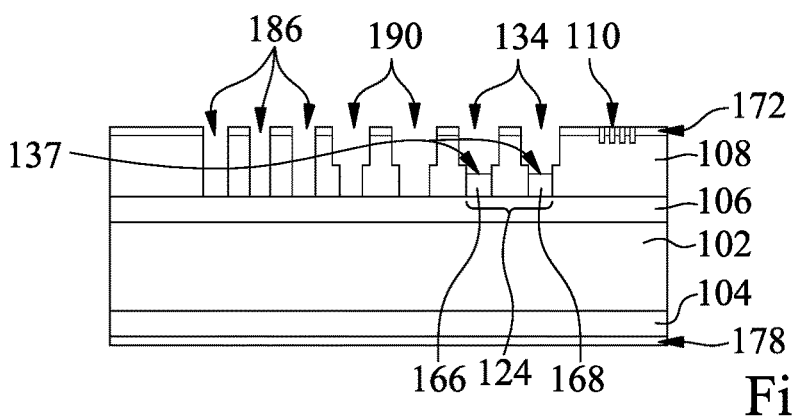

A photoresist 194 is then formed and patterned on the photonic device 100, as shown in FIG. 2P. Accordingly, photoresist 194 is deposited into the strip holes 186, and the R2S holes 190. Doping is then performed on the silicon layer 108 exposed in the rib contact holes 134. As shown in FIG. 2Q, a rib N+ doped component 166, and a rib P+ doped component 168 are formed within the first silicon layer 108 in the rib contact holes 134, below the contact hole trench 137. As will be appreciated, the doping to form components 166 and 168 may be done, for example, by ion implantation. As discussed above, an ion implanter is used to implant atoms into a silicon crystal lattice, modifying the conductivity of the lattice in the implanted location. An ion implanter generally includes an ion source, a beam line, and a process chamber. The ion source produces the desired ions (here, for example, Co, Ti, Ni, Pt, or Pb, depending on desired N- or P-type electrode). The beam line organizes the ions into a beam having high purity in terms of ion mass, energy, and species. The ion beam is then used to irradiate the wafer substrate in a process chamber. The ion beam strikes the exposed regions on the wafer substrate, and the ions can be implanted into the substrate as dopants at desired depths. Alternatively, the substrate can be partially etched, followed by blanket deposition of a metal, followed by annealing in which the metal reacts with the underlying exposed silicon. Unreacted metal can then be removed, for example with a selective etch process.

Figure 2R:
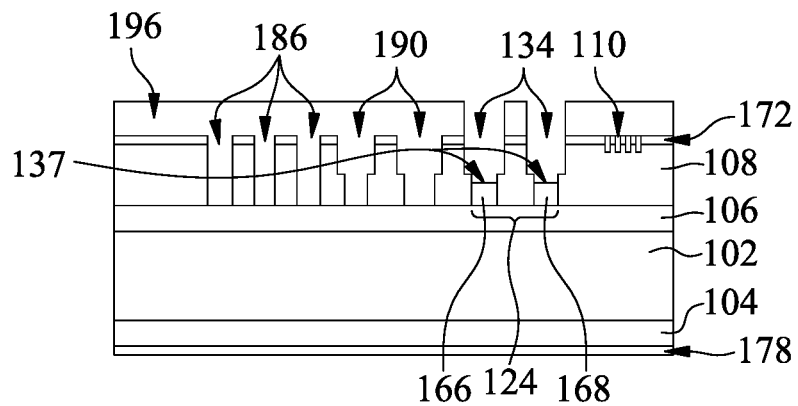
Figure 2S:
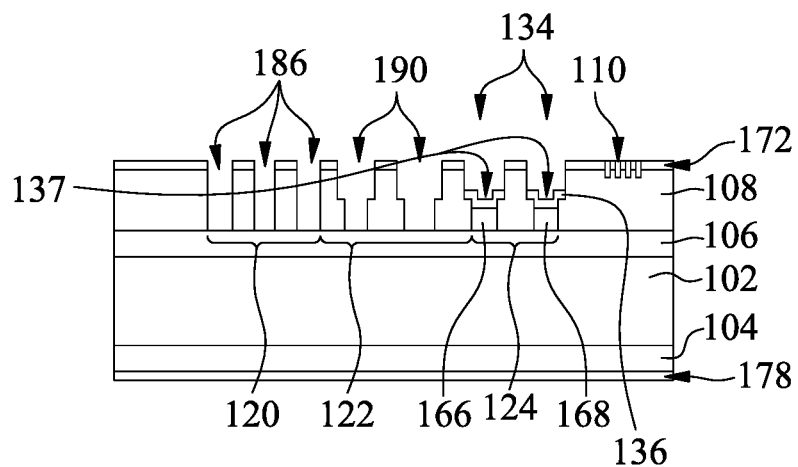

A photoresist 196 is then deposited into the strip holes 186, the R2S holes 190, and the first contact holes 134 as shown in FIG. 2R. In accordance with one embodiment, a contact oxide layer 136 is then deposited on the bottom of the rib contact holes 134 in the contact hole trenches 137, as shown in FIG. 2S. In accordance with some embodiments, the contact oxide layer 136 may comprise, for example and without limitation, non-low-k dielectric materials such as silicon oxide, silicon carbide (SiC), silicon carbo-nitride (SiCN), silicon oxy-carbo-nitride (SiOCN), or the like. As illustrated in FIG. 2S, the contact oxide layer 136 covers a portion of the bottom of the rib contact holes 134, extending downward into the contact trench 137, thereby defining a portion of the contact etch stop layer cavities 135 therein (as illustrated in FIG. 2Y, discussed in greater detail below).

Figure 2T:
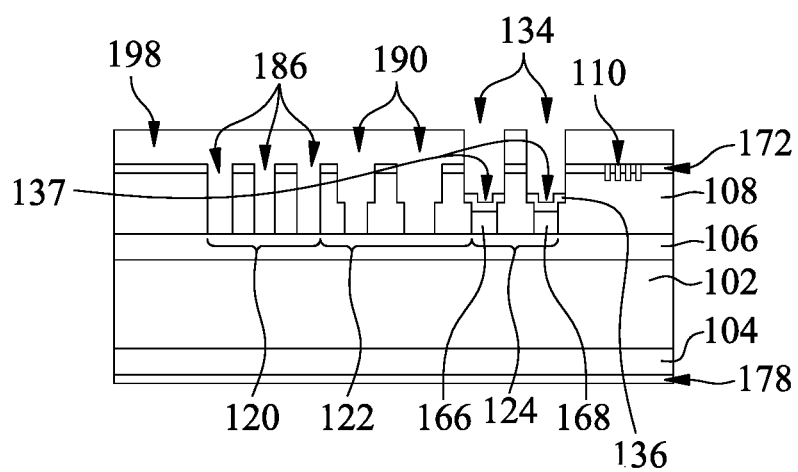
Figure 2U:
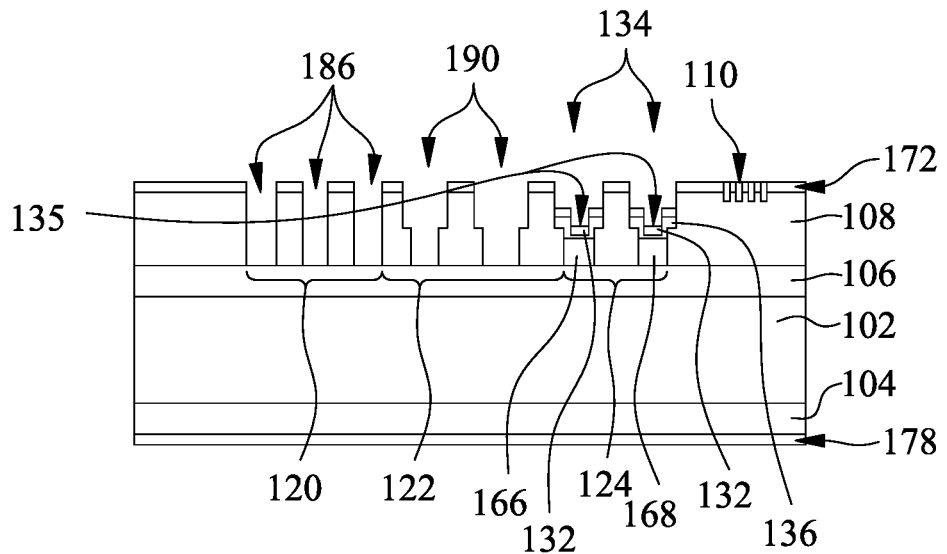

As shown in FIG. 2T, a photoresist 198 is applied and patterned, protecting the strip holes 186 and the R2S holes 190, thereby exposing the rib contact holes 134. Thereafter, a contact etch stop layer (CESL) 132 is deposited in the rib contact holes 134 and, as shown in FIG. 2U, the contact etch stop layer cavities 135 on the contact oxide layer 136 within the contact hole trenches 137 positioned above respective doped components 166-168. In accordance with some embodiments, the contact etch stop layer (CESL) 132 suitably comprises a layer of material that has drastically different etching characteristics than the material to be etched, so as to stop or halt the etching processing of the layer deposited on the etch stop layer. Accordingly, the contact etch stop layer (CESL) 132 may comprise, for example and without limitation tantalum oxide (TaO), tantalum (Ta), titanium (Ti), silicon nitride (SiN), and the like.

Figure 2V:
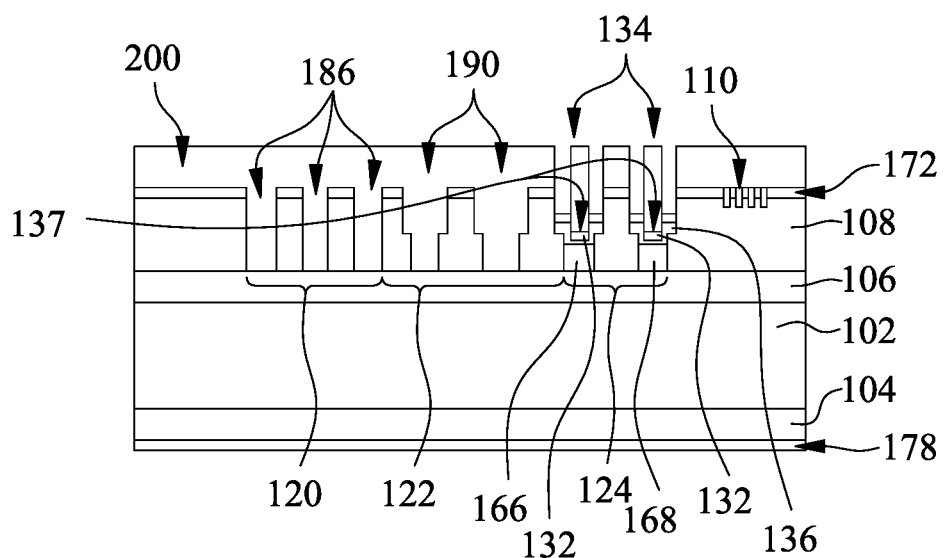
Figure 2W:
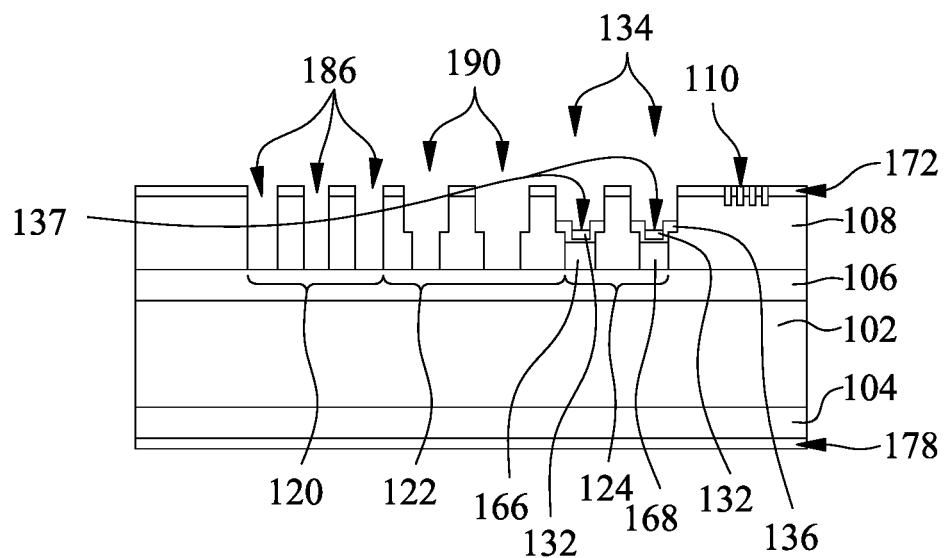
Figure 2X:
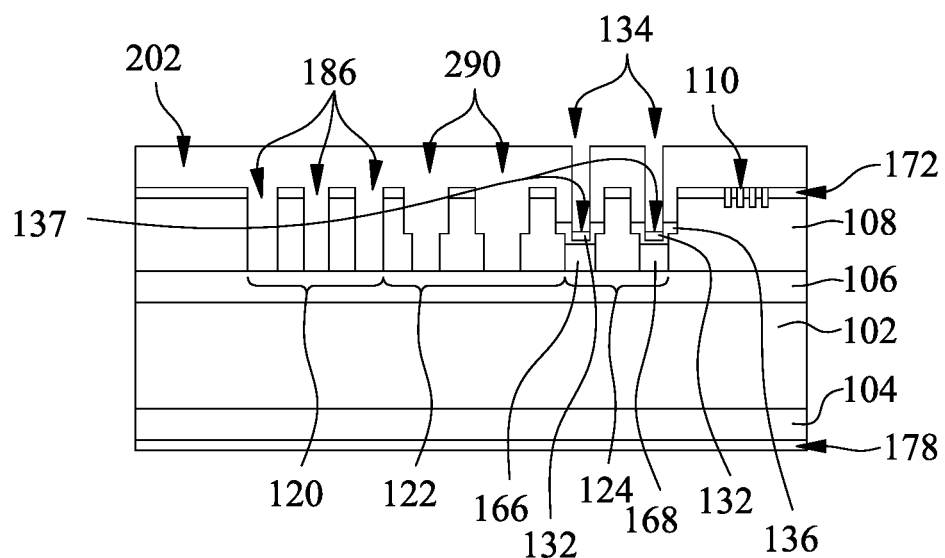
Figure 2Y:
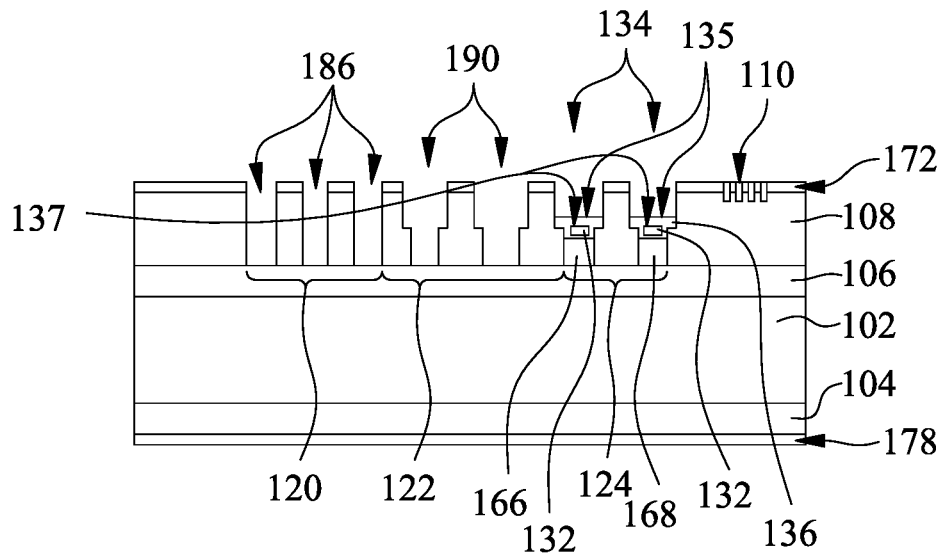

In FIG. 2V, a photoresist 200 is then deposited and patterned to enable removal of contact etch stop layer material 132 from portions of the rib contact holes 134, as shown. After removal of the uncovered contact etch stop layer material 132 and photoresist 200, the contact etch stop layer 132 in the contact etch stop layer cavity 135 is illustrated in FIG. 2W. As shown in FIG. 2X, a photoresist 202 is then deposited and patterned on the device 100 in accordance with some embodiments. As illustrated in FIG. 2X, the photoresist 202 is patterned to enable deposition of contact oxide layer 136 material on the contact etch stop layer 132. A fully encapsulated contact etch stop layer 132 is depicted thereafter in FIG. 2Y.

Figure 2Z:
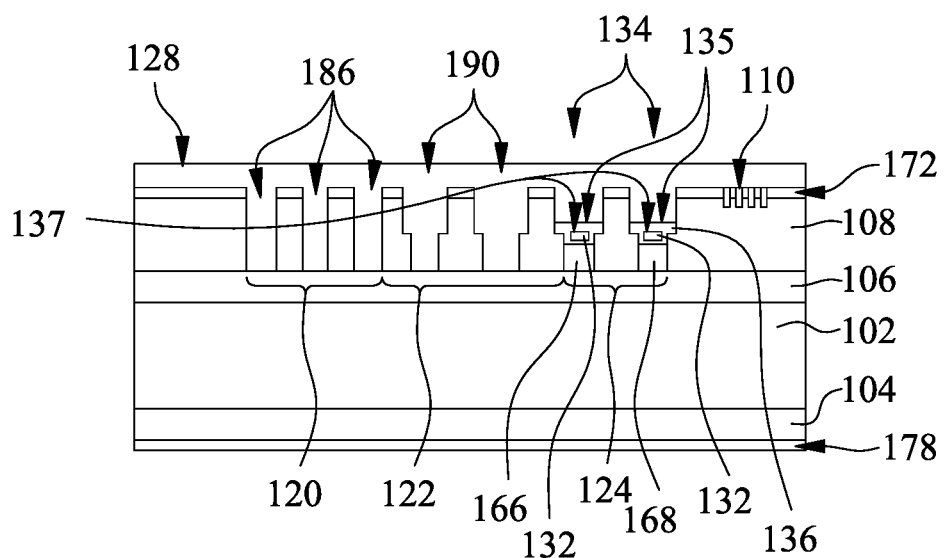
Figure 2A:
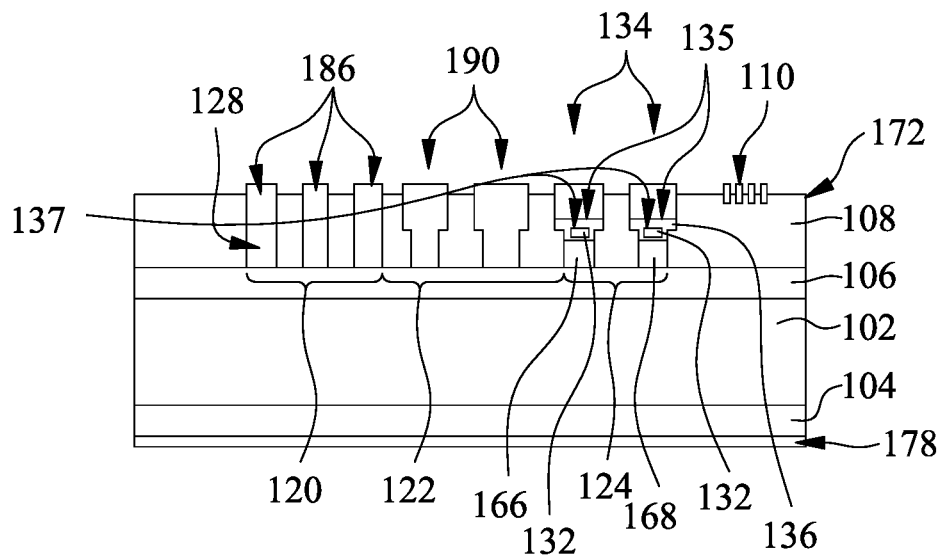
Figure 2A:
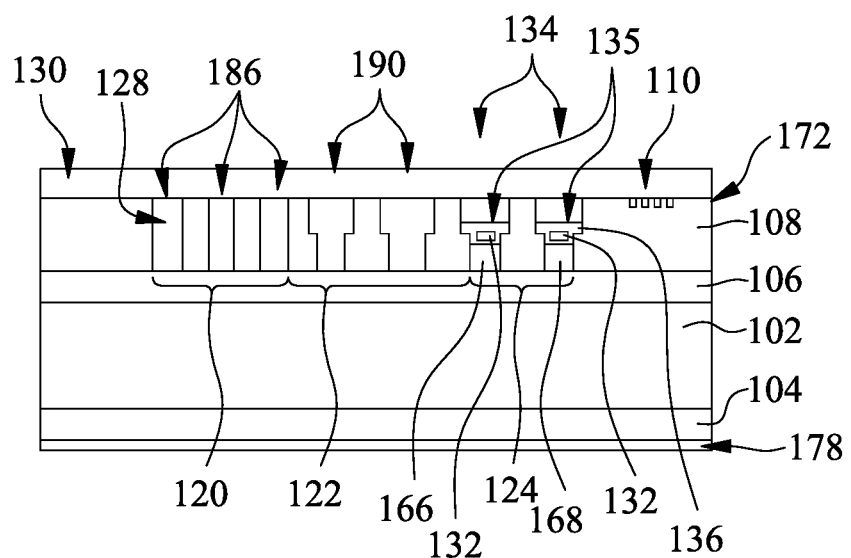
Figure 2A:
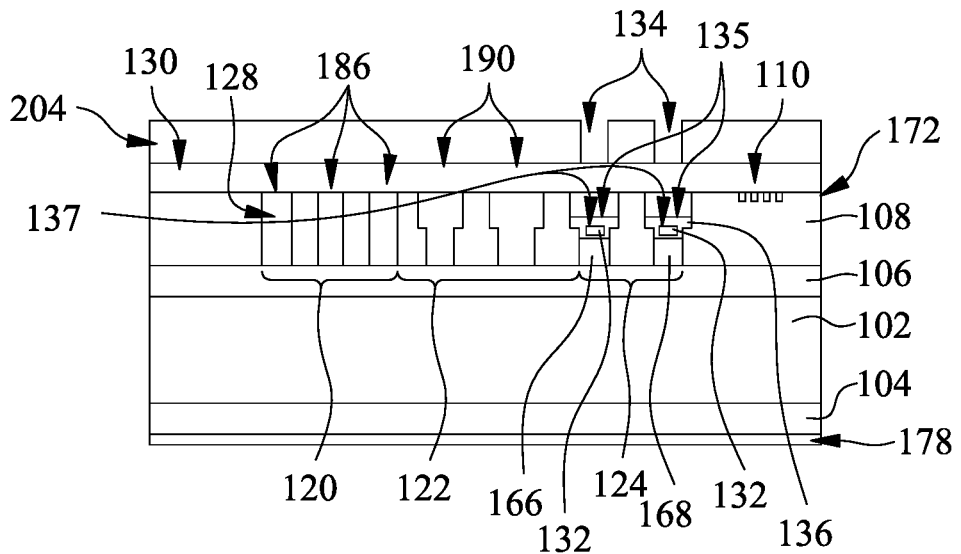
Figure 2A:
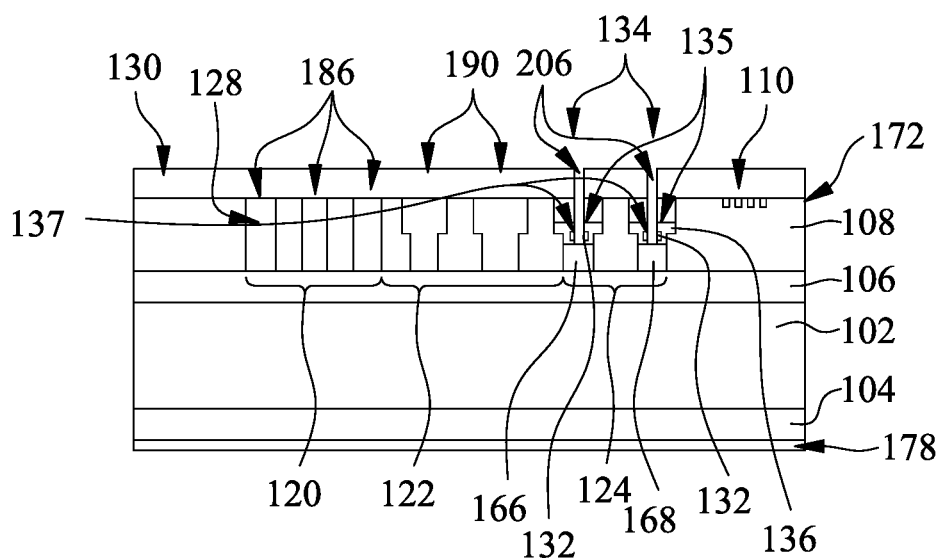

A silicate glass material 128 is then deposited on the photonic device 100, as shown in FIG. 2Z. As indicated above, the silicate glass material 128 is suitably formed in the strip holes 186, the R2S holes 190, and the rib contact holes 134. Thereafter, CMP and polyimide etching (i.e., removal of the hard mask 172) is performed, as depicted in FIG. 2AA. Undoped silicate glass 130 is then deposited, as shown in FIG. 2AB. In accordance with some embodiments, the undoped silicate glass (USG) component 130 may be implemented having a thickness in the range of 5000 angstroms to 10,000 angstroms. In one embodiment, the undoped silicate glass (USG) component 130 is implanted with a thickness of 8 angstroms.

In FIG. 2AC, a photoresist 204 is deposited and patterned on the undoped silicate glass (USG) component 130. As shown, the photoresist 204 is suitably patterned to allow for subsequent formation of rib contact cavities 206 located within the rib contact holes 134. Etching is then performed to create the rib contact cavities 206, as shown in FIG. 2AD. In accordance with some embodiments, CMP may also be performed to planarize the undoped silicate glass (USG) component 130. Thereafter, as will be appreciated, subsequent formation of the photonic device 100 may be performed, e.g., forming the rib contacts 138, interlayer dielectric fabrication, the metal components 140, the bump pad 142, formation of the pillar 114, the pillar cavity 116, etc.

Figure 3A:
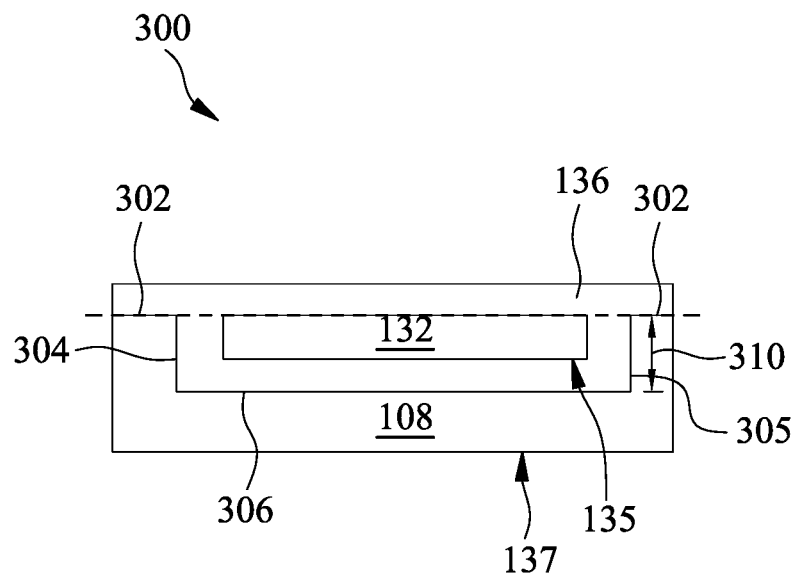
FIGS. 3A-3B are cross-sectional views of a rib trench in accordance with a first embodiment.
Figure 3B:
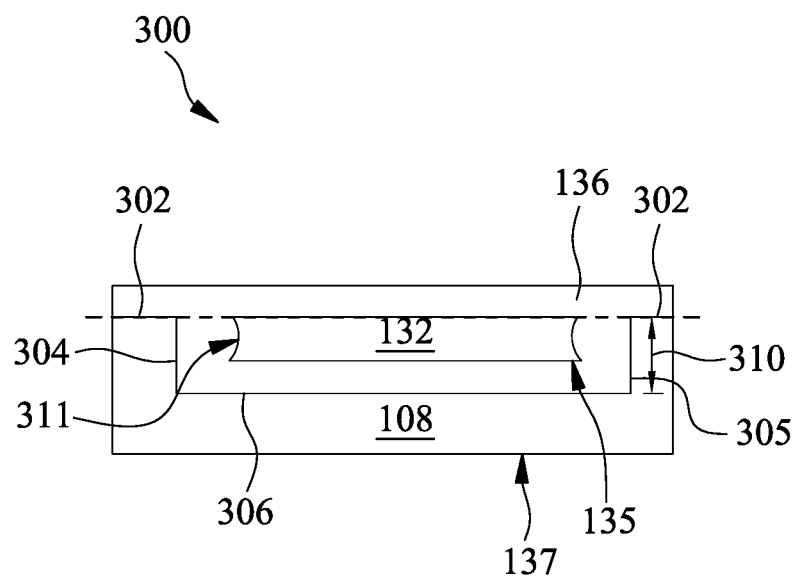

Turning now to FIGS. 3A-3B, there are shown close-up cross-sectional views of a bottom portion 300 of the rib contact hole 134 in accordance with a first embodiment. That is, FIGS. 3A-3B illustrate the contact hole trench 137 in which the contact etch stop layer 132 is formed within the etch stop layer cavities 135 fabricated via dry etch processes (FIG. 3A) and wet etch processes (FIG. 3B). Accordingly, the cross-sections shown in FIGS. 3A and 3B are identical with respect to the position of the etch stop layer cavity 135, however the etching performed on the contact etch stop layer 132 (as described above with respect to FIGS. 2U-2Y) are different. As shown, the sides of the dry etched etch stop layer 132 in FIG. 3A has a substantially straight edge. In contrast, FIG. 3B, via wet etching, denotes a curve, arc, or radian 311 on the sides of the etch stop layer 132 as a result of the wet etching process. It will be appreciated that the wet etching materials may remove some material of the contact etch stop layer 132 during patterning, resulting in the slight radian 311 illustrated in FIG. 3B. According to such embodiments, the radian 311 at this junction of the contact etch stop layer (CESL) 132 and contact oxide layer 136 may be approximately one-tenth the thickness of the contact etch stop layer (CESL) 132.

Figure 3C:
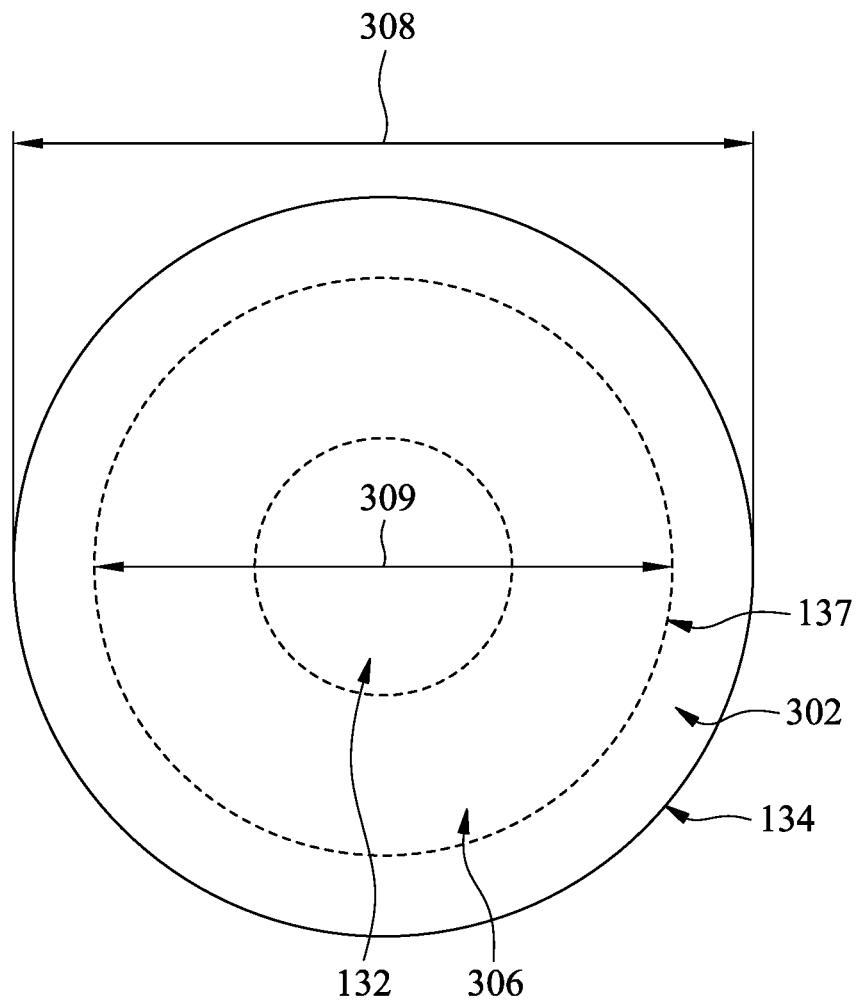
FIG. 3C is a top view of FIGS. 3A-3B.

Thus, FIGS. 3A-3C show the formation of the contact hole trench 137 in the silicon layer 108 within the contact hole 134, wherein the contact hole trench 137 includes a top surface 302, a first sidewall 304, a second sidewall 305, and a bottom surface 306, wherein the top surface 302 is level across the contact hole trench 137. In accordance with one embodiment, the top surface 302 is perpendicular to the first sidewall 304 and to the second sidewall 305. As shown in FIGS. 3A-3B, the sidewalls 304-305 and bottom surface 306 of the contact hole trench 137 include an oxide contact layer 136 formed thereon. FIGS. 3A-3B further depict the position of the contact etch stop layer 132 within the etch stop layer cavity 135, which is defined by those portions of the contact oxide layer 136 formed on the sidewalls 304-305 and bottom surface 306 of the contact hole trench 137, as well as the contact oxide layer 136 formed over the contact etch stop layer (CESL) 132, i.e., the contact oxide layer 136 material that is positioned across the top surface 302 and the contact etch stop layer (CESL) 132. As shown in FIG. 3A and FIG. 3B, the top of the contact etch stop layer (CESL) 132 is parallel, i.e., even, with the top surface 302 of the contact hole trench 137 in the silicon layer 108 located in the contact hole 134. As shown, the height of the exterior sidewalls 304-305 of the contact hole trench 137 is at least 5% of the depth of the contact 138 (not shown). FIG. 3C illustrates a top view of the embodiments depicted in FIGS. 3A-3B. The contact hole 134 depicted in FIG. 3C is circular, however it will be appreciated that other shapes, e.g., rectangular, polygonal, etc., may also be used in varying embodiments.

As shown in FIG. 3C, the upper portion of the contact hole 134 has a width or diameter 308 that is greater than a width or diameter 309 of the lower portion of the contact hole 134, i.e., the contact hole trench 137. Further, the top surface 302 extends circumferentially around the bottom surface 306 of the contact hole trench 137. As discussed above, the contact oxide layer 136 is formed across the lower portion of the contact hole 134, i.e., across the contact hole trench 137, thereby encapsulating the contact etch stop layer (CESL) 132.

Figure 4A:
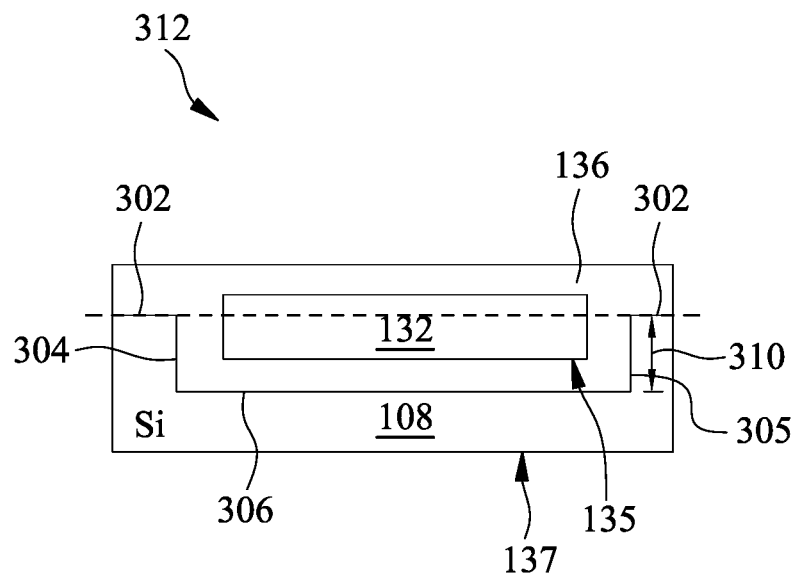
FIGS. 4A-4B are cross-sectional views of a rib trench in accordance with a second embodiment.
Figure 4B:
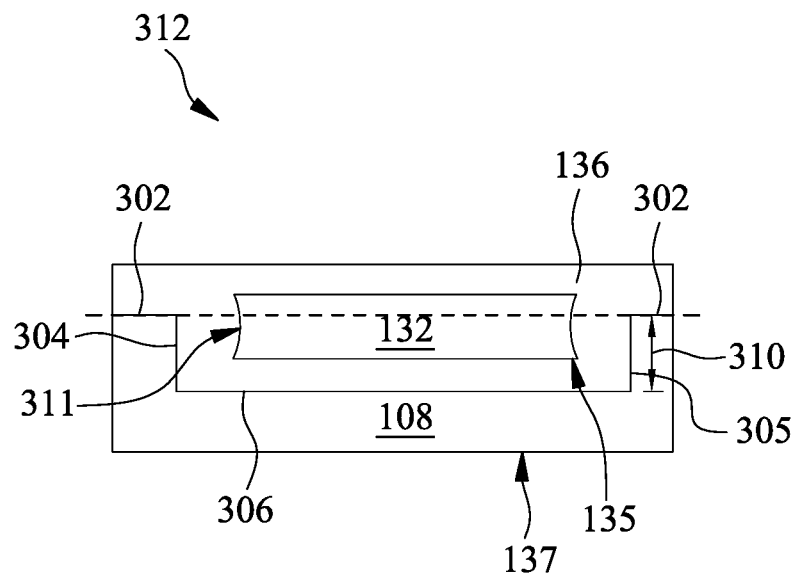

Referring now to FIGS. 4A-4B, there are shown close-up cross-sectional views of a bottom portion 312 of the rib contact hole 134 in accordance with a second embodiment. That is, FIGS. 4A-4B illustrate the contact hole trench 137 in which the contact etch stop layer (CESL) 132 is placed within the etch stop layer cavities 135 fabricated via dry etch processes (FIG. 4A) and wet etch processes (FIG. 4B) with the contact etch stop layer (CESL) 132 positioned partially above the top surface 302 of the etch stop layer cavity 135. Accordingly, the cross-sections shown in FIGS. 4A and 4B are identical with respect to the position of the etch stop layer cavity 135, however the etching performed on the contact etch stop layer (CESL) 132 (as described above with respect to FIGS. 2U-2Y) are different. As shown, the sides of the dry etched etch stop layer (CESL) 132 in FIG. 4A has a substantially straight edge. In contrast, FIG. 4B, via wet etching, denotes a curve, arc, or radian 311 on the sides of the etch stop layer (CESL) 132 as a result of the wet etching process. It will be appreciated that the wet etching materials may remove some material of the contact etch stop layer 132 during patterning, resulting in the slight radian 311 illustrated in FIG. 4B. According to such embodiments, the radian 311 at this junction of the contact etch stop layer (CESL) 132 and contact oxide layer 136 may be approximately one-tenth the thickness of the contact etch stop layer (CESL) 132.

Thus, FIGS. 4A-4B show the formation of the contact hole trench 137 in the silicon layer 108 within the contact hole 134, wherein the contact hole trench 137 includes same surfaces i.e., 302-306 described above with respect to FIGS. 3A-3B. However, in the second embodiment 312 of FIGS. 4A-4B, the contact etch stop layer (CESL) 132 is positioned with a portion thereof extending above the plane of the top surface 302, i.e., the contact etch stop layer (CESL) 132 is higher than the top surface 302 of the contact hole trench 137 in the silicon layer 108 at bottom the contact hole 134. As shown in FIGS. 4A-4B, the sidewalls 304-305 and bottom surface 306 of the contact hole trench 137 include the oxide contact layer 136 formed thereon. As discussed above with respect to FIGS. 3A-3B, the height 310 of the sidewalls 304-305 of the contact hole trench 137 shown in FIGS. 4A-4B is at least 5% of the depth of the contact 138 (not shown). It will be understood that the embodiment of FIGS. 4A-4B remains the same as FIGS. 3A-3B when viewed from above, and thus FIG. 3C may be used to illustrate a top view of the embodiment of FIGS. 4A-4B.

Figure 5A:
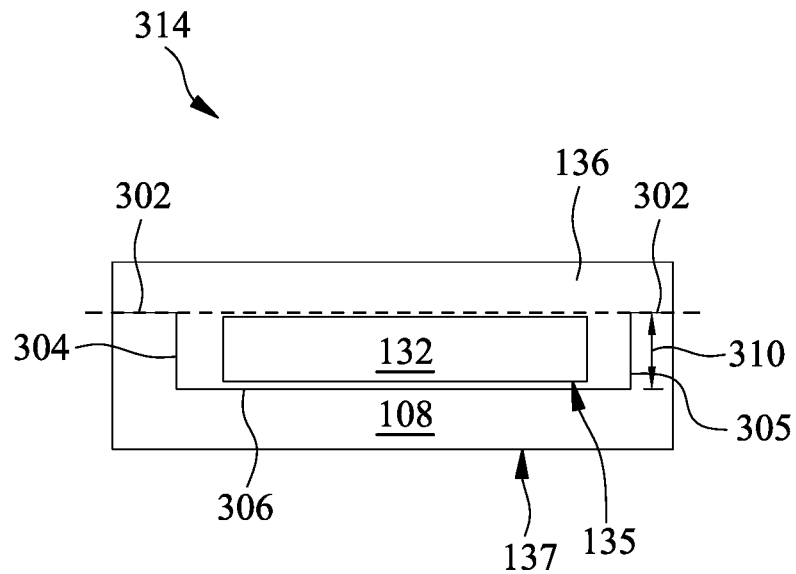
FIGS. 5A-5B are cross-sectional views of a rib trench in accordance with a third embodiment.
Figure 5B:
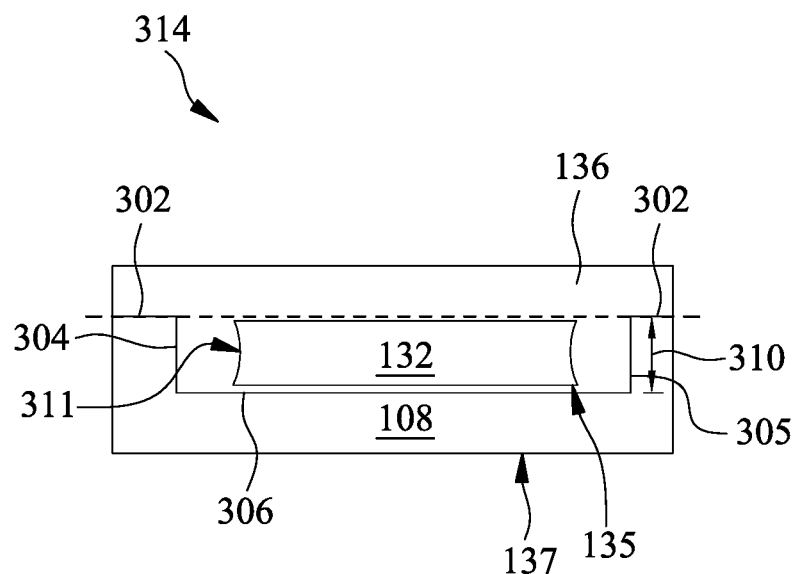

FIGS. 5A-5B show close-up cross-sectional views of a bottom portion 314 of the rib contact hole 134 in accordance with a third embodiment. That is, FIGS. 5A-5B illustrate the contact hole trench 137 in which the contact etch stop layer (CESL) 132 is deposited within the etch stop layer cavity 135 fabricated via dry etch processes (FIG. 5A) and wet etch processes (FIG. 5B) with the contact etch stop layer (CESL) 132 positioned partially below the top surface 302 of the etch stop layer cavity 135. Accordingly, the cross-sections shown in FIGS. 5A and 5B are identical with respect to the position of the etch stop layer cavity 135, however the etching performed on the contact etch stop layer (CESL) 132 (as described above with respect to FIGS. 2U-2Y) are different. As shown, the sides of the dry etched etch stop layer (CESL) 132 in FIG. 5A has a substantially straight edge. In contrast, FIG. 5B, via wet etching, denotes a curve, arc, or radian 311 on the sides of the etch stop layer (CESL) 132 as a result of the wet etching process. It will be appreciated that the wet etching materials may remove some material of the contact etch stop layer 132 during patterning, resulting in the slight radian 311 illustrated in FIG. 5B. According to such embodiments, the radian 311 at this junction of the contact etch stop layer (CESL) 132 and contact oxide layer 136 may be approximately one-tenth the thickness of the contact etch stop layer (CESL) 132.

Thus, FIGS. 5A-5B show the formation of the contact hole trench 137 of the silicon layer 108 within the contact hole 134, wherein the contact hole trench 137 includes same surfaces i.e., 302-306 described above with respect to FIGS. 3A-4B. However, in the third embodiment 314 of FIGS. 5A-5B, the contact etch stop layer (CESL) 132 is positioned below the plane of the top surface 302 of the contact hole trench 137. As shown in FIGS. 5A-5B, the sidewalls 304-305 and bottom surface 306 of the contact hole trench 137 include the oxide contact layer 136 formed thereon. As discussed above with respect to FIGS. 3A-4B, the height 310 of the sidewalls 304-305 of the contact hole trench 137 shown in FIGS. 5A-5B is at least 5% of the depth of the contact 138 (not shown). It will be understood that the embodiment of FIGS. 4A-4B remains the same as FIGS. 3A-3B when viewed from above, and thus FIG. 3C may be used to illustrate a top view of the embodiment of FIGS. 4A-4B.

Figure 6:
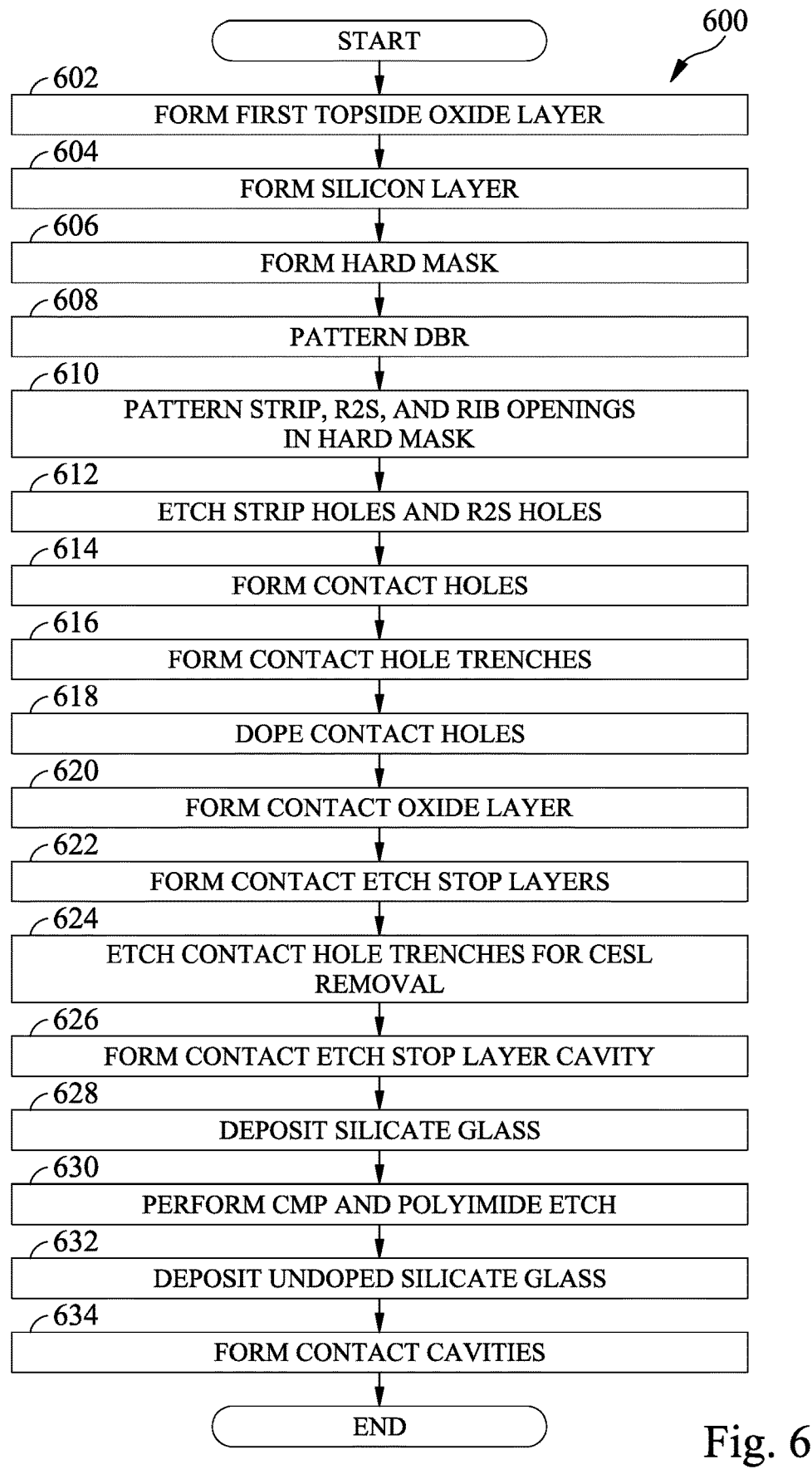
FIG. 6 is a flowchart of a method of fabricating a photonic device structure in accordance with some embodiments.

Referring now to FIG. 6, there is shown a flowchart 600 illustrating a method of fabricating a photonic device structure in accordance with one exemplary embodiment. As shown in FIG. 6, the on the method begins at step 602, whereupon a first topside oxide layer 106 is formed on a substrate 102, as shown in FIG. 2B. In some embodiments, the substrate 102 may be an SOI (Silicon on Insulator) substrate. A silicon layer 108 is then formed on the first topside oxide layer 106 at step 604. FIG. 2C provides an illustrative example of the deposition of the silicon layer 108. At step 606, a hard mask 172 is formed on the silicon layer 108, as illustrated in FIG. 2D.

A distributed Bragg reflector 110 is then patterned in the hard mask 172 and the silicon layer 108 at step 608. FIGS. 2E and 2F, as discussed above, provide illustrative examples of the processes performed at step 608. At step 610, strip, R2S, and rib hard mask openings 182 are patterned, as shown in FIGS. 2G-2I. Thereafter, at step 612 etching is performed to remove portions of the silicon layer 108 to form the strip holes 186 and R2S holes 190. FIGS. 2J-2K provide illustrations of the formation of the strip holes 186 and R2S holes 190 in accordance with some embodiments.

At step 614, rib contact holes 134 corresponding to a rib waveguide component 124 are formed in silicon layer 108. As illustrated in FIGS. 2L-2M, a photoresist 188 may be deposited and patterned on the silicon layer 108, followed by etching to remove portions of the silicon layer 108, thereby defining the rib contact holes 134. At step 616, contact hole trenches 137 are formed, i.e., patterned, etched, etc., in the contact holes 134. FIGS. 2N-2O illustrate that formation of the contact hole trenches 137 may include the application and patterning of a photoresist 192, etching to remove a portion of the silicon layer 108, in the bottom of the contact holes 134 resulting in the contact hole trenches 137.

At step 618, the silicon layer 108 of the first contact holes 134 below the contact hole trenches 137 is doped, as shown in FIGS. 2P-2Q. As discussed above, N+ component 166 and P+ component 168 are formed in the first contact holes 134 of the rib waveguide component 124. At step 620, the contact oxide layer 136 is formed, i.e., deposited and patterned, in contact holes 134, as shown in FIGS. 2R-2S. In accordance with one embodiment, the contact oxide layer 136 is deposited on the contact hole trenches 137, on the top surface 302, sidewalls 304-305, and bottom surface 306. As shown in FIGS. 2R-2S, patterning may include, for example and without limitation, application and patterning of a photoresist 196, followed by deposition of the contact oxide layer 136 and removal of the photoresist 196.

Thereafter, at step 622, a contact etch stop layer (CESL) 132 is formed in the contact hole trenches 137 of the contact holes 134. Formation of the contact etch stop layer (CESL) 132 may include patterning (application, development, etc.) of a photoresist 198 as shown in FIG. 2T. As illustrated in FIG. 2U, the formation of the contact etch stop layer (CESL) 132 may result in contact etch stop layer (CESL) 132 material be deposited on the top surface 302 of the contact trenches 137. Accordingly, at step 624, contact trenches 137 are etched to remove the aforementioned contact etch layer (CESL) 132 material deposited on the top surface 302. In such embodiments, a photoresist 200 may be applied and patterned to protect the portion of the contact etch stop layer (CESL) 132 material formed between the sidewalls 304-305 of the contact trenches 137, as illustrated in FIG. 2V. Suitable etching processes may then be performed, resulting in the intermediate stage of fabrication shown in FIG. 2W. It will be appreciated that when dry etching is performed at this stage of fabrication, the contact etch stop layer (CESL) 132 in contact trenches 137 will have the generally straight edge, as shown in FIGS. 3A, 4A, and 5B. When a wet etching is performed to remove the extra materials, a radian 311 may result from the wet etch process, as illustrated in FIGS. 3B, 4B, and 5B.

At step 626, the etch stop layer cavities 135 are formed in the contact hole trenches 137, as illustrated in FIGS. 2X-2Y. In accordance with one embodiment, a photoresist 202 may be applied and patterned so as to leave the contact etch stop layer (CESL) 132 remaining in the contact hole trench 137 exposed, as illustrated in FIG. 2X. Thereafter, deposition of the contact oxide layer 136 encapsulating the contact etch stop layer (CESL) 132 is performed, as illustrated in FIG. 2Y. At step 628, a silicate glass 128 is deposited, filling in the contact holes 134, as illustrated in FIG. 2Z. Thereafter, at step 630 CMP and polyimide etching (i.e., removal of the hard mask 172) is performed, as depicted in FIG. 2AA. At step 632, a layer of undoped silicate glass 130 is deposited on the silicon layer 108, as illustrated in FIG. 2AB. At step 634, contact cavities 206 are formed in the contact holes 134, as shown in FIGS. 2AC-2AD. As shown in FIG. 2AD, the contact cavities 206 extend through the undoped silicate glass 130, the silicate glass 128, the contact oxide layer 136 and the contact etch stop layer 132, allowing for subsequent formation of contacts 138, as illustrated in FIG. 1.

In accordance with a first embodiment, there is provided a photonic device structure. The structure includes a substrate that has a topside oxide layer and a silicon layer that is formed on the topside oxide layer. The structure further includes a rib waveguide component formed in the silicon layer and which includes contact holes. The contact holes include an upper portion formed in the silicon layer having a first width, and a lower portion comprising a contact hole trench formed in the silicon layer having a second width narrower than the first width. The contact hole further includes a contact etch stop layer formed in the contact hole trench.

In accordance with a second embodiment, there is provided a photonic semiconductor device. The photonic semiconductor device includes a substrate and a first topside oxide layer that is formed on the substrate. The device further includes a silicon layer that is formed on the first topside oxide layer. The silicon layer of the photonic semiconductor device includes a first waveguide component, a second waveguide component, and at least one third waveguide component that includes contact holes. In addition, each contact hole includes an upper portion formed in the silicon layer having a first width, and a lower portion comprising a contact hole trench formed in the silicon layer having a second width narrower than the first width. The contact hole further includes a contact etch stop layer formed in the contact hole trench.

In accordance with a third embodiment, there is provided a method for fabricating a photonic semiconductor device. The method includes forming a silicon layer on a first topside oxide layer of a substrate, and forming a strip waveguide, a rib to strip waveguide and/or a distributed Bragg reflector waveguide in the silicon layer. The method also includes forming contact holes of a rib waveguide in the silicon layer. In addition, the method includes forming a contact hole trench in each of the contact holes, such that the contact hole trench includes a first sidewall, a second sidewall and a bottom surface. The method also includes doping one of the contact holes to a dopant concentration of N+ and a second contact hole to the dopant concentration of P+, and forming a contact oxide layer in each contact hole trench on the first sidewall, the second sidewall, and the bottom surface. Further, the method includes forming a contact etch stop layer in each of the contact holes on the contact oxide layer between the first and second sidewalls.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photonic device structure, comprising:
   a substrate including a topside oxide layer formed thereon;
   a silicon layer formed on the topside oxide layer;
   a rib waveguide component formed in the silicon layer, having a plurality of contact holes, wherein each of the plurality of contact holes comprises:
      an upper portion formed in the silicon layer having a first width; and
      a lower portion comprising a contact hole trench formed in the silicon layer having a second width narrower than the first width; and
   a contact etch stop layer formed in the contact hole trench.

2. The photonic device structure of claim 1, further comprising a contact oxide layer formed in the contact hole trench, wherein the contact oxide layer defines a contact etch stop layer cavity and wherein the contact etch stop layer is formed therein.

3. The photonic device structure of claim 2, wherein the contact hole trench further comprises a first sidewall, a second sidewall, and a bottom surface, and wherein the contact oxide layer is formed on the first sidewall, the second sidewall and the bottom surface.

4. The photonic device structure of claim 3, wherein the contact hole trench further comprises a top surface perpendicular to the first sidewall and the second sidewall, and wherein the contact oxide layer is formed on the top surface.

5. The photonic device structure of claim 4, wherein a top of the contact etch stop layer is level with the top surface.

6. The photonic device structure of claim 4, wherein a top of the contact etch stop layer is positioned above a plane formed by the top surface.

7. The photonic device structure of claim 4, wherein a top of the contact etch stop layer is positioned below a plane formed by the top surface.

8. The photonic device structure of claim 4, wherein a distance between the contact etch stop layer and the silicon layer of the contact hole trench is greater than or equal to one-fourth a thickness of the contact etch stop layer.

9. The photonic device structure of claim 2, wherein a depth of the contact etch stop layer is 5% or greater than a depth of the contact hole.

10. A photonic semiconductor device comprising:
a substrate;
a first topside oxide layer formed on the substrate; and
a silicon layer formed on the first topside oxide layer, the silicon layer comprising:
a first waveguide component,
a second waveguide component, and
at least one third waveguide component, the at least one third waveguide component comprising a plurality of contact holes, wherein each of the plurality of contact holes further comprises:
an upper portion formed in the silicon layer having a first width, and
a lower portion comprising a contact hole trench formed in the silicon layer having a second width narrower than the first width; and
a contact etch stop layer formed in the contact hole trench.

11. The photonic semiconductor device of claim 10, further comprising:
a pillar;
a pillar cavity formed in the substrate between the pillar and the first topside oxide layer;
a facet positioned adjacent to the silicon layer, and
a light source positioned on the pillar and optically coupled to the facet.

12. The photonic semiconductor device of claim 10, further comprising a contact oxide layer formed in the contact hole trench, wherein the contact oxide layer defines a contact etch stop layer cavity and wherein the contact etch stop layer is formed therein.

13. The photonic device of claim 12, the contact hole trench further comprises a first sidewall, a second sidewall, and a bottom surface, and wherein the contact oxide layer is formed on the first sidewall, the second sidewall and the bottom surface.

14. The photonic device of claim 13, wherein the contact hole trench further comprises:
a top surface perpendicular to the first sidewall and to the second sidewall, wherein the contact oxide layer is formed on the top surface.

15. The photonic device of claim 14, wherein a top of the contact etch stop layer is positioned at least level with the top surface, below the top surface, or above the top surface.

16. The photonic device of claim 14, wherein a distance between the contact etch stop layer and the silicon layer of the contact hole trench is greater than or equal to one-fourth a thickness of the contact etch stop layer.

17. The photonic device of claim 12, wherein a depth of the contact etch stop layer is 5% or greater than a depth of the contact hole.

18. A method of fabricating a photonic semiconductor device, comprising:
forming a silicon layer on a first topside oxide layer of a substrate;
forming at least one of a strip waveguide, a rib to strip waveguide or a distributed Bragg reflector waveguide in the silicon layer;
forming a plurality of contact holes of a rib waveguide in the silicon layer;
forming a contact hole trench in each of the plurality of contact holes, the contact hole trench including a first sidewall, a second sidewall and a bottom surface;
doping at least one of the plurality of contact holes to a dopant concentration of N+ and at least a second one of the plurality of contact holes to the dopant concentration of P+;
forming a contact oxide layer in each contact hole trench on the first sidewall, the second sidewall, and the bottom surface; and
forming a contact etch stop layer in each of the plurality of contact holes on the contact oxide layer between the first and second sidewalls.

19. The method of claim 18, wherein a depth of the contact etch stop layer is 5% or greater than a depth of the contact hole.

20. The method of claim 18, wherein a distance between the contact etch stop layer and the silicon layer of the contact hole trench is greater than or equal to one-fourth a thickness of the contact etch stop layer.

* * * * *